United States Patent [19]

Sinsky et al.

[11] Patent Number: 5,206,289
[45] Date of Patent: Apr. 27, 1993

[54] RUBBER STOCK CONTAINING A POLYHYDRIC PHENOXY RESIN

[75] Inventors: Mark S. Sinsky, Akron; Richard G. Bauer, Kent; Paul H. Sandstrom, Tallmadge; Jerry L. Brenner, Copley, all of Ohio

[73] Assignee: The Goodyear Tire & Rubber Company, Akron, Ohio

[21] Appl. No.: 826,566

[22] Filed: Jan. 27, 1992

[51] Int. Cl.$^5$ .................. C08L 7/00; C08L 9/00; C08L 63/02; C08L 71/10
[52] U.S. Cl. .................. 525/114; 525/109; 525/110; 525/151; 525/184
[58] Field of Search .............. 525/109, 110, 114, 187, 525/132, 151

[56] References Cited

U.S. PATENT DOCUMENTS

| | | | |
|---|---|---|---|
| 2,602,075 | 7/1952 | Carpenter et al. | 260/47 |
| 3,324,197 | 6/1967 | Schwarzer | 525/109 |
| 3,639,702 | 2/1972 | Endter | 525/139 |

OTHER PUBLICATIONS

Encyclopedia of Polymer Science and Technology, vol. 10, pp. 111–122.
Reinking, N. H. et al., Polyhydroxy Ethers, Journal of Applied Polymer Science, vol. 7, pp. 2135–2144.

*Primary Examiner*—Jacob Ziegler
*Attorney, Agent, or Firm*—Bruce J. Hendricks

[57] ABSTRACT

The present invention relates to a rubber stock containing 0.1 to 10.0 phr of a polyhydric phenoxy resin. The polyhydric phenoxy resins may be used as a replacement for resorcinol and function as a methylene acceptor. The rubber stocks of the present invention exhibit improved tensile strength at break without the inherent fuming problems associated with resorcinol containing rubber stocks. These beneficial properties are obtained while maintaining high low strain stiffness and cord adhesion associated with resorcinol containing stocks.

19 Claims, No Drawings

RUBBER STOCK CONTAINING A POLYHYDRIC PHENOXY RESIN

BACKGROUND OF THE INVENTION

A pneumatic tire is a polymeric composite and is a complex system of interacting components, each with specific properties for maximum effectiveness. A frequent problem in making a rubber composite is maintaining good adhesion between the rubber and the reinforcement. A conventional method in promoting the adhesion between the rubber and the reinforcement is to pretreat the reinforcing fiber with a mixture of a rubber latex and a phenol-formaldehyde condensation product wherein the phenol is almost always resorcinol. This is the so called "RFL" (resorcinol-formaldehyde-latex) method. An alternative method of promoting such adhesion is to generate the resin in-situ (in the vulcanized rubber/textile matrix) by compounding a vulcanizing rubber stock composition with the phenol/formaldehyde condensation product (hereinafter referred to as the "in-situ method"). The components of the condensation product consist of a methylene acceptor and a methylene donor. The most common methylene donors include N-(substituted oxymethyl) melamine, hexamethylenetetramine or hexamethoxymethylmelamine. A common methylene acceptor is a dihydroxybenzene compound such as resorcinol. The in-situ method has been found to be particularly effective where the reinforcing material is steel wire since pretreatment of the wire with the RFL system has been observed to be largely ineffective.

Resorcinol is known to form a resin network within a rubbery polymer by reacting with various methylene donors. Unfortunately, the use of resorcinol has some inherent disadvantages. Resorcinol is not readily dispersed in rubber and in fact neither the resin, nor the resorcinol become chemically bound to the rubber. Additionally, resorcinol in its raw form is excessively volatile and is potentially an environmental hazard.

There have been numerous attempts to replace resorcinol, however, few if any have had much success. For example, in U.S. Pat. No. 4,605,696 there is disclosed a method for enhancing adhesion of rubber to reinforcing materials through the use of phenolic esters as the methylene acceptor.

Therefore, there exists a need to find a suitable resorcinol replacement.

SUMMARY OF THE INVENTION

The present invention relates to a rubber stock comprising (1) a rubber selected from the group consisting of natural rubber, rubbers derived from a diene monomer, or mixtures thereof and 0.1 to 10.0 phr of a polyhydric phenoxy resin of the formula:

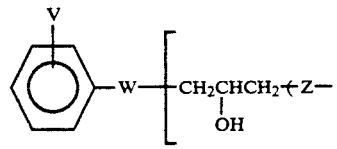

-continued

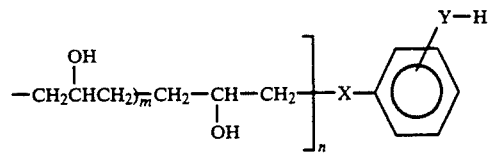

wherein V is —OH or —NH$_2$ and W is —O— or

however, when V is —NH$_2$, W is —O— and when W is

V is —OH;
wherein X and Y are either —O— or

however, when X is —N—, Y is —O— and when Y is

X is —O—;
wherein Z is selected from the group consisting of:

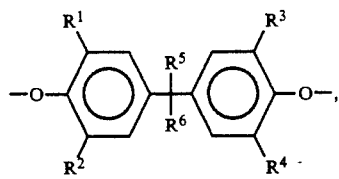

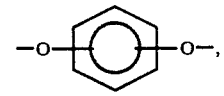

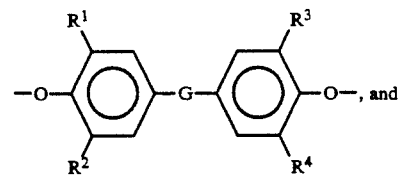

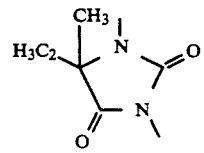

wherein R$^1$, R$^2$, R$^3$, and R$^4$ are each independently selected from the group consisting of H and Cl; R$^5$ and R$^6$ are independently selected from the group consisting of hydrogen, alkyls having from 1 to 9 carbon atoms, and CQ$_3$ where Q is selected from the group consisting of F or Cl; G is selected from the group consisting of —O—,

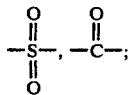

n is an integer of from 1 to 20; and m is an integer of from 0 to 10.

DETAILED DESCRIPTION OF THE PREFERRED EMBODIMENT

In addition, there is disclosed a rubber stock comprising (1) a rubber selected from the group consisting of natural rubber, rubbers derived from a diene monomer, or mixtures thereof, and (2) 0.1 to 10.0 phr of a polyhydric phenoxy resin which is the oligomeric and/or polymeric reaction product between (a) resorcinol, aminophenol or mixtures thereof; and (b) an epoxy compound having at least two epoxy groups and selected from the group consisting of the diglycidyl ether of bisphenol A, the diglycidyl ether of tetrachlorobisphenol A, the diglycidyl ether of resorcinol, the diglycidyl ether of cashew phenol, the diglycidyl ether of hydroquinone, the diglycidyl ether of catechol, 5-ethyl-5-methyl-1,3-diglycidylhydantoin and mixtures thereof, wherein said reaction product has a molecular weight range from about 450 to about 10,000.

The polyhydric phenoxy resin may be used at various levels in the rubber compounds of the present invention. For example, the level may range from about 0.1 to 10.0 by weight per 100 parts of rubber (also known as "phr"). Preferably, the level ranges from about 2.0 to about 5.0 phr.

With respect to the above formulae, preferably V is —OH, W is —O—, X is —O—, Y is —O—, and Z is:

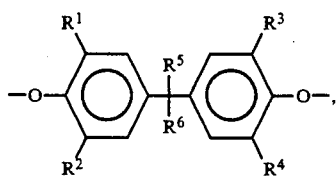

and R$^1$, R$^2$, R$^3$ and R$^4$ are each hydrogen; R$^5$ and R$^6$ are each an alkyl having 1 carbon atom; m is 0 and n is an integer of from about 1 to 5.

The polyhydric phenoxy resins used in the present invention can be prepared by reacting certain epoxy compounds with aminophenol or resorcinol. The epoxy compound must have at least two epoxy groups. While not being limiting, some specific epoxy compounds that may be used include the diglycidyl ether of bisphenol A, the diglycidyl ether of bisphenol F, the diglycidyl ether of tetrachlorobisphenol A, the diglycidyl ether of resorcinol, the diglycidyl ether of cashew phenol, the diglycidyl ether of hydroquinone, the diglycidyl ether of catechol, 5-ethyl-5-methyl-1,3-diglycidyl hydantoin and the like.

The aminophenol or resorcinol is reacted with the above epoxy compound under suitable conditions to form the polyhydric phenoxy resin. The resorcinol or aminophenol may be reacted with any of the above epoxy compounds in a variety of mole ratios. Generally the mole ratio of the resorcinol to the epoxy compound ranges from about 3:1 to about 1.2:1 with a range of from about 2.1:1 to about 1.9:1 being preferred. Generally, the mole ratio of the aminophenol to the epoxy compound ranges from about 3.1:1 to about 1.2:1 with a range of from about 2.1:1 to about 1.9:1 being preferred.

The reaction between the resorcinol or aminophenol and the epoxy compound may be neat (without any solvent) or an organic solvent may be used. The solvent is preferably inert to the reaction between the resorcinol or aminophenol and the epoxy compound. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkylnaphthalene, and the like; acetone; ethers such as tetrahydrofuran, tetrahydropyran, diethylether, 1,2-dimethoxybenzene, 1,2-diethoxybenzene, the mono- and dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and not interfere with the reaction.

The reaction between the resorcinol or aminophenol and the epoxy compound to form the polyhydric phenoxy resins may be conducted over a wide temperature range. The temperature may range from moderate to an elevated temperature. In general, the reaction may be conducted at a temperature of between about 130° C. to 220° C. The preferred temperature range is from about 140° C. to 170° C., while the most preferred temperature range is from about 150° C. to 165° C.

The reaction to form the polyhydric phenoxy resin may be conducted under a variety of pressures. Pressures ranging from about 5 psig to 150 psig may be used. Preferably, the reaction is conducted at atmospheric pressure.

In a preferred method for producing the polyhydric phenoxy resins of the present invention, it is desirable to add the epoxy compound to the reactor which contains the aminophenol or resorcinol. This method of addition permits one to maintain the reaction temperatures and avoid the undesirable crosslinking of the epoxy compound.

The reaction between the epoxy compound and the resorcinol or aminophenol to form the polyhydric phenoxy resin may be conducted with or without a catalyst. Examples of catalysts that may be used include phosphonium salts, alkali bases, ammonia, organic amines, and quaternary ammonium salts. An example of a quaternary ammonium salt is benzyltriethylammonium chloride. The amount of catalyst that may be used will vary depending on the particular catalyst that is selected. For example, when a quaternary ammonium salt is used, from about 0.05 to about 3 parts by weight of the polyhydric phenoxy resin to be prepared.

The reaction to form the polyhydric phenoxy resins is conducted for a period of time sufficient to produce the desired product. In general, the reaction time can vary from minutes to several hours. If the more sluggish reaction conditions are selected, then the reaction time will have to be extended until the desired product is produced. It is appreciated that the residence time of the reactants will be influenced by the reaction temperature, concentration and choice of catalyst, total gas pressure, partial pressure exerted by its components, concentration and choice of solvent, and other factors.

The process for the preparation of the polyhydric phenoxy resins may be carried out in a batch, semi-continuous or continuous manner. The reaction may be conducted in a single reaction zone or in a plurality of reaction zones, in series or in parallel. The reaction may be conducted intermittently or continuously in an elongated tubular zone or in a series of such zones. The material of construction of the equipment should be such as to be inert during the reaction. The equipment should also be able to withstand the reaction temperatures and pressures. The reaction zone can be fitted with internal and/or external heat exchangers to control temperature fluctuations. Preferably, an agitation means is available to ensure the uniform reaction. Mixing induced by vibration, shaker, stirrer, rotating, oscillation, etc. are all illustrative of the types of agitation means which are contemplated for use in preparing the composition of the present invention. Such agitation means are available and well known to those skilled in the art.

Upon completion of the reaction, the polyhydric phenoxy resin may be oligomeric, polymeric or a mixture thereof. Accordingly, the molecular weight may vary widely. For example, the molecular weight may range from about 450 to about 10,000. Preferably, the molecular weight will range from about 500 to about 2,500. For purposes of the present invention, the term "oligomeric" is intended to describe those polyhydric phenoxy resins having a molecular weight ranging from about 450 to 3,000. The term polymeric is intended to describe the polyhydric phenoxy resins with molecular weights greater than 3,000.

Rubber stocks containing natural rubber or rubbers derived from a diene monomer may be modified with the resin compositions of the present invention. Examples of rubbers derived from a diene monomer include substituted and unsubstituted, saturated and unsaturated, synthetic polymers. The natural polymers include natural rubber in its various forms, e.g., pale crepe and smoked sheet, and balata and gutta percha. The synthetic polymers include those prepared from a single monomer (homopolymer) or a mixture of two or more copolymerizable monomers (copolymer) when the monomers are combined in the random distribution or block form. In addition to the diene monomers, other monomers may be used. Of all the monomers that may be used, the monomers may be substituted or unsubstituted and may possess one or more double bonds, for example, diene monomers, both conjugated and non-conjugated, and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene, homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50% by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene.

The rubber compounds which may be modified by the polyhydric phenoxy resins of the present invention are preferably cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

The vulcanizable rubber compositions of the present invention may contain a methylene donor. The term "methylene donor" is intended to mean a compound capable of reacting with the polyhydric phenoxy resin and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

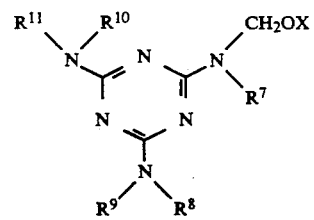

wherein X is an alkyl having from 1 to 8 carbon atoms, $R^7$, $R^8$, $R^9$, $R^{10}$ and $R^{11}$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N',N"-trimethylol-melamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

The weight ratio of methylene donor to the polyhydric phenoxy resin may vary. Generally speaking, the weight ratio will range from about 1:10 to about 10:1. Preferably, the weight ratio ranges from about 1:3 to 3:1.

Vulcanization of the rubber stock of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

In addition to the polyhydric phenoxy resin, other rubber additives may also be incorporated in the rubber stock. The additives commonly used in rubber vulcanizates are, for example, carbon black, tackifier resins, processing aids, antioxidants, antiozonants, stearic acid, activators, waxes, oils and peptizing agents. As known to those skilled in the art, depending on the intended use of the rubber compound, certain additives mentioned above are commonly used in conventional amounts. Typical additions of carbon black comprise about 20 to 100 parts by weight of diene rubber (phr), preferably 30 to 80 phr. Typical amounts of tackifier resins comprise about 1 to 5 phr. Typical amounts of antiozonants comprise 1 to about 10 phr. Typical amounts of stearic acid comprise 1 to about 2 phr. Typical amounts of zinc oxide comprise 2 to 5 phr. Typical amounts of waxes comprise 1 to 5 phr. Typical amounts of oils comprise 5 to 40 phr. Typical amounts of peptizers comprise 0.1 to 1 phr. The presence and relative amounts of the above additives are not an aspect of the present invention.

The vulcanization of the rubber stock is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.0 to 2.25 being preferred.

Accelerators are conventionally used to control the time and/or temperature required for vulcanization and to improve the properties of the vulcanizate. In some instances, a single accelerator system may be used, i.e., primary accelerator. Conventionally, a primary accelerator is used in amounts ranging from about 0.5 to 2.0 phr. In another instance, combinations of two or more accelerators may be used which may consist of a primary accelerator which is generally used in the large amount (0.5 to 2.0 phr), and a secondary accelerator which is generally used in smaller amounts (0.01–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used include amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The rubber stocks containing the polyhydric phenoxy resins may be used in the preparation of composite products including tires, power belts, conveyor belts, printing rolls, rubber shoe heels and soles, rubber wringers, automobile floor mats, mud flaps for trucks, ball mill liners, and the like. Preferably, the rubber vulcanizates are used in wire coat stocks, carcass ply or overlay compounds for tires.

The following examples are presented in order to illustrate but not limit the present invention.

EXAMPLE 1

A sealed dry one liter glass vessel was fitted with a magnetic stirbar and oil bath. The vessel was charged with 34.7 grams (0.204 equivalents of epoxide) of the diglycidyl ether of bisphenol A and 21.8 grams (0.200 mole) of aminophenol. The mixture was heated to 150° C. with stirring until a solution was obtained. After two minutes, an exotherm to 158° C. and an increase in the viscosity of the mixture occurred. Stirring and heating was continued for 15 minutes. The mixture was allowed to cool. The product was a glassy amber solid having a melting point of approximately 85° C. and a specific gravity of 1.10 g/cc.

EXAMPLE 2

A sealed dry one liter glass vessel was fitted with a magnetic stirbar and oil bath. The vessel was charged with 288 grams (2.10 equivalents of epoxide) of 5-ethyl-5-methyl-1,3-diglycidylhydantoin and 218.3 grams (2.0 moles) of 3-aminophenol. The mixture was heated to 150° C. with stirring until a solution was obtained. After two minutes, an exotherm was noted and an increase in the viscosity of the mixture occurred. Stirring and heating was continued for 15 minutes. The mixture was allowed to cool. The product was a glassy dark solid having a melting point of approximately 109° C. and a specific gravity of 1.32 g/cc.

EXAMPLE 3

A sealed dry one liter glass vessel was fitted with a magnetic stirbar and oil bath. The vessel was charged with 248.2 grams (1.46 equivalents of epoxide) of the diglycidyl ether of bisphenol A and 151 grams (1.37 moles) of resorcinol. The mixture was heated to 155° C. with stirring until a solution was obtained. 2.0 grams of benzyltriethylammonium chloride was added to the vessel and resealed. After two minutes, an exotherm was noted and an increase in the viscosity of the mixture occurred. Stirring and heating was continued for 30 minutes. The mixture was allowed to cool. The product was a glassy amber solid having a melting point of approximately 60° C. and a specific gravity of 1.29 g/cc. The molecular weight of the polyhydric phenoxy resin ranged from 560 to upwards of 10,000.

EXAMPLE 4

A sealed dry one liter glass vessel was fitted with a magnetic stirbar and oil bath. The vessel was charged with 478 grams (2.81 equivalents of epoxide) of the diglycidyl ether of bisphenol A and 232.2 grams (2.11 moles) of resorcinol. The mixture was heated to 155° C. with stirring until a solution was obtained. 3.5 grams of benzyltriethylammonium chloride was added to the vessel and resealed. After two minutes, an exotherm was noted and an increase in the viscosity of the mixture occurred. Stirring and heating was continued for 30 minutes. The mixture was allowed to cool. The product was a glassy amber solid having a melting point of approximately 60° C. and a specific gravity of 1.12 g/cc.

EXAMPLE 5

A sealed dry 100 milliliter glass vessel was fitted with a magnetic stirbar and oil bath. The vessel was charged with 12.8 grams (0.10 equivalents of epoxide) of the diglycidyl ether of resorcinol and 11.0 grams (0.10 mole) of resorcinol. The mixture was heated to 155° C. with stirring until a solution was obtained. 0.12 grams of benzyltriethylammonium chloride was added to the vessel and resealed. After two minutes, an exotherm was noted and an increase in the viscosity of the mixture occurred. Stirring and heating was continued for 30 minutes. The mixture was allowed to cool. The product was a glassy amber solid having a melting point of approximately 63°–65° C. and a specific gravity of 1.15 g/cc.

EXAMPLE 6

A sealed dry one liter glass vessel was fitted with a magnetic stirbar and oil bath. The vessel was charged with 445.8 grams (3.39 equivalents of epoxide) of 5-ethyl-5-methyl-1,3-diglycidylhydantoin and 355.3 grams (3.25 moles) of resorcinol. The mixture was heated to 155° C. with stirring until a solution was obtained. 4.0 grams of benzyltriethylammonium chloride was added to the vessel and resealed. After two minutes, an exotherm was noted and an increase in the viscosity of the mixture occurred. Stirring and heating was continued for 30 minutes. The mixture was allowed to cool. The product was a glassy amber solid having a melting point of approximately 75°–90° C. and a specific gravity of 1.22 g/cc.

EXAMPLE 7

Physical Testing

Table I below shows the basic rubber stock that was used in this example. The rubber compound was prepared in a 2-stage Banbury mix. All parts and percentages are by weight unless otherwise noted. The cure data as well as other physical data for each sample are listed in Table II.

TABLE I

| NON-PRODUCTIVE | |
| --- | --- |
| Natsyn ® 2200 | 100.0 |
| Carbon Black | 50.0 |
| Processing Oil | 5.0 |
| Stearic Acid | 1.0 |
| Zinc Oxide | 5.0 |
| Antidegradant[1] | 2.0 |
| Resorcinol | Varied |
| Polyhydric Phenoxy Resin | Varied |
| PRODUCTIVE | |
| N-cyclohexylthiophthalimide | 0.20 |
| N-t-butyl-2-benzothiazole sulfenamide | 1.0 |
| Sulfur | 1.4 |
| Methylene Donor | Varied |

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwark, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the rubber stocks that were prepared. These properties include a torque minimum (Min. Torque), a torque maximum (Max. Torque), minutes to 2 lbf.in. rise above min. torque (t2), minutes to 25% of the torque increase (t25), minutes to 90% of the torque increase (t90) and difference between the maximum torque and minimum torque (delta torque).

Peel adhesion (Strebler Adhesion) testing was done to determine the interfacial adhesion between various rubber formulations that were prepared. The interfacial adhesion was determined by pulling one compound away from another at a right angle to the untorn test specimen with the two ends being pulled apart at a 180 degree angle to each other using an Instron machine. The area of contact was determined from placement of a Mylar sheet between the compounds during cure. A window in the Mylar allowed the two materials to come into contact with each other during testing.

Shore Hardness was determined in accordance with ASTM-1415.

Table II indicates the amounts of resorcinol, methylene donor, and/or polyhydric phenoxy resin that was used in each sample. The resorcinol and polyhydric phenoxy resin were added to the rubber stocks in the non-productive stage. The methylene donor was added at the productive stage.

TABLE II

| | Control Sample 1 | Control Sample 2 | Sample 3 | Sample 4 | Sample 5 | Sample 6 |
| --- | --- | --- | --- | --- | --- | --- |
| Resorcinol (phr) | 0 | 3 | 0 | 0 | 0 | 0 |
| Resin of Ex. 3 (phr) | 0 | 0 | 3 | 3 | 3 | 5 |
| Methylene Donor[2] (phr) | 0 | 3 | 0 | 5 | 3 | 3 |
| Rheometer | | | | | | |
| T max (min.) | 37.3 | 42.9 | 38.0 | 40.6 | 41.3 | 44.3 |
| T min (min.) | 8.8 | 11.6 | 10.4 | 10.3 | 10.5 | 10.6 |
| Delta Torque (min.) | 28.5 | 31.3 | 27.6 | 30.3 | 30.8 | 33.6 |
| T 25 (min.) | 14.6 | 6.6 | 10.3 | 13.8 | 13.6 | 12.6 |

TABLE II-continued

|  | Control Sample 1 | Control Sample 2 | Sample 3 | Sample 4 | Sample 5 | Sample 6 |
|---|---|---|---|---|---|---|
| T 90 (min.) | 17.7 | 13.8 | 17.1 | 18.4 | 18.1 | 20.7 |
| Stress Strain |  |  |  |  |  |  |
| 100% Modulus (MPa) | 1.9 | 2.3 | 1.9 | 2.2 | 2.3 | 2.6 |
| 300% Modulus (MPa) | 10.0 | 8.3 | 8.1 | 8.9 | 9.2 | 9.7 |
| Break Strength (MPa) | 21.9 | 12.5 | 20.0 | 19.1 | 21.0 | 17.1 |
| % Elongation | 571 | 437 | 609 | 562 | 586 | 488 |
| Hardness, RT | 59.5 | 71.4 | 66.8 | 70.0 | 70.9 | 73.9 |
| Hardness, 100° C. | 56.1 | 66.1 | 58.6 | 64.9 | 65.8 | 68.5 |
| Rheovibron |  |  |  |  |  |  |
| E' at 60° C. (MPa) | 14.4 | 22.0 | 22.3 | 23.5 | 24.7 | 27.5 |
| Tan Delta at 60° C. | .076 | .095 | .075 | .089 | .084 | .083 |
| Strebler Adhesion | 148 | 147 | 112 | 118 | 154 | 154 |
| Seat Adhesion to PE | 114 | 154 | 141 | 156 | 141 | 175 |
| Instron Tear | 234 | 111 | 214 | 222 | 217 | 186 |

[2] Hexamethoxymethylmelamine

Looking at the above data in Table II, one can see the advantage of the present invention. Sample 2 (Control) vs. Sample 1 (Control) illustrates that the values for Tmax (maximum torque), 100% modulus, hardness and E' at 60° C. are increased which is evidence of resin formation. Samples 3-6 (present invention) demonstrate that these properties are similarly improved by use of the polyhydric phenoxy resin and especially when the methylene donor is present as in Sample 2 with the resorcinol. The unexpected result was the higher break strength obtained with the present invention versus the prior art system of Sample 2.

EXAMPLE 8

Table III below shows the physical properties for the rubber stock of Table I along with resorcinol, methylene donor and/or polyhydric phenoxy resin. The amount of resorcinol, methylene donor and polyhydric phenoxy resin is listed in Table III. The rubber compound was prepared in a 2-stage Banbury mix. The methylene donor was added in the productive stage whereas the resorcinol and polyhydric phenoxy resin were added to the nonproductive stage.

TABLE III

|  | Control Sample 1 | Sample 2 | Sample 3 |
|---|---|---|---|
| Resorcinol | 3 | 0 | 0 |
| Resin of Ex. 1 (phr) | 0 | 3 | 0 |
| Resin of Ex. 2 (phr) | 0 | 0 | 3 |
| Methylene donor[2] (phr) | 3 | 3 | 3 |
| Rheometer |  |  |  |
| Tmax (min.) | 43.8 | 40.5 | 39.5 |
| Tmin (min.) | 11.7 | 13.1 | 10.8 |
| Delta Torque (min.) | 32.1 | 27.4 | 28.7 |
| T25 (min.) | 8.6 | 14.7 | 14.2 |
| T90 (min.) | 16.2 | 18.7 | 17.6 |
| Stress Strain |  |  |  |
| 100% Modulus (MPa) | 2.5 | 2.0 | 1.0 |
| 300% Modulus (MPa) | 9.0 | 9.5 | 9.5 |
| Break Strength (MPa) | 13.8 | 19.4 | 19.3 |
| % Elongation | 445 | 534 | 531 |
| Hardness, RT | 74.1 | 59.9 | 61.2 |
| Hardness, 100° C. | 67.7 | 56.2 | 57.7 |
| Rebound, RT (%) | 47.1 | 50.1 | 48.9 |
| Rebound, 100° C. (%) | 55.8 | 62.9 | 61.7 |
| Strebler to Self, N | 144 | 152 | — |
| Rheovibron |  |  |  |
| E' at 60° C. (MPa) | 20.8 | 16.7 | — |
| Tan Delta at 60° C. | .091 | .085 | — |

[2] Hexamethoxymethylmelamine

The data in Table III illustrate aminophenol derived polyhydric phenoxy resins in combination with methylene donors. As one can see, the break strength values for these polyhydric phenoxy resins are superior to the control (Sample 1).

EXAMPLE 9

The rubber stocks of Example 9 contained the ingredients listed in Table I. Table IV below provides the physical properties of each sample as well as the representative amount of resorcinol, polyhydric phenoxy resin and methylene donor.

TABLE IV

|  | Control Sample 1 | Control Sample 2 | Sample 3 |
|---|---|---|---|
| Resorcinol | 0 | 3 | 0 |
| Resin of Ex. 3 | 0 | 0 | 3 |
| Methylene donor[3] | 0 | 3 | 3 |
| Rheometer |  |  |  |
| Tmax (min.) | 37.3 | 49.4 | 43.7 |
| Tmin (min.) | 8.8 | 13.6 | 10.8 |
| Delta Torque (min.) | 28.5 | 35.8 | 32.9 |
| T25 (min.) | 14.6 | 7.4 | 7.6 |
| T90 | 17.7 | 10.9 | 10.9 |
| Stress Strain |  |  |  |
| 100% Modulus | 1.9 | 2.9 | 2.6 |
| 300% Modulus | 10.0 | 12.0 | 10.8 |
| Break Strength | 21.9 | 17.2 | 19.4 |
| % Elongation | 571 | 437 | 505 |
| Hardness, RT | 59.5 | 72.9 | 68.9 |
| Hardness, 100° C. | 56.1 | 69.1 | 64.2 |
| Rebound, RT | 49.7 | 48.8 | 48.1 |
| Rebound, 100° C. | 65.0 | 62.3 | 60.5 |
| Rheovibron |  |  |  |
| E' at 60° C. (×10E7) | 14.4 | 18.8 | 19.5 |
| Tan Delta, 60° C. | .076 | .063 | .065 |
| Strebler Adhesion | 148 | 87 | 83 |
| Seat Adhesion to PE | 114 | 138 | 165 |

[3] Hexamethylenetetramine

Looking at the above data in Table IV, one can see the advantage of the present invention. Sample 2 (Control) versus Sample 1 (Control) illustrates that the values for Tmax (maximum torque), 100% modulus, hardness and E' at 60° C. are increased which is evidence of resin formation. Sample 3 (present invention) demonstrates that these properties are similarly improved by use of the polyhydric phenoxy resin. The unexpected result was the higher break strength obtained with the present invention versus the prior art system of Sample 2. This data also demonstrates the use of another methylene donor with the polyhydric phenoxy resin of the present invention.

EXAMPLE 10

The rubber stocks of Example 10 contained the ingredients listed in Table I except in those stocks containing a polyhydric phenoxy resin, no retarder (N-cyclohexyl-thiophthalimide) was used. Table V below provides the physical properties of each sample as well as the respective amount of resorcinol, methylene donor and polyhydric phenoxy resin.

TABLE V

|  | Sample 1 Control | Sample 2 | Sample 3 | Sample 4 | Sample 5 | Sample 6 | Sample 7 | Sample 8 |
|---|---|---|---|---|---|---|---|---|
| Resorcinol | 3 | 0 | 0 | 0 | 0 | 0 | 0 | 0 |
| Resin of Ex. 3 | 0 | 3 | 3 | 0 | 0 | 0 | 0 | 0 |
| Resin of Ex. 4 | 0 | 0 | 0 | 3 | 3 | 0 | 0 | 0 |
| Resin of Ex. 5 | 0 | 0 | 0 | 0 | 0 | 3 | 3 | 0 |
| Resin of Ex. 6 | 0 | 0 | 0 | 0 | 0 | 0 | 0 | 3 |
| Methylene Donor[2] | 3 | 3 | 2 | 3 | 2 | 3 | 2 | 3 |
| Rheometer |  |  |  |  |  |  |  |  |
| T max (min.) | 44.0 | 41.0 | 40.0 | 39.8 | 40.0 | 44.0 | 39.5 | 38.5 |
| T min (min.) | 10.5 | 9.2 | 8.7 | 9.2 | 8.7 | 9.2 | 9.4 | 8.0 |
| Delta Torque (min.) | 33.5 | 31.8 | 31.3 | 33.5 | 31.3 | 34.8 | 30.1 | 30.5 |
| T 25 (min.) | 6.5 | 8.3 | 8.0 | 9.0 | 8.3 | 7.5 | 7.5 | 8.5 |
| T 90 (min.) | 13.8 | 13.0 | 13.5 | 12.8 | 11.8 | 12.5 | 11.3 | 12.5 |
| Stress Strain |  |  |  |  |  |  |  |  |
| 100% Modulus (MPa) | 2.4 | 2.2 | 2.2 | 2.2 | 2.3 | 2.4 | 2.3 | 2.0 |
| 300% Modulus (MPa) | 8.5 | 8.8 | 9.0 | 8.9 | 9.6 | 9.4 | 9.1 | 9.1 |
| Break Strength (MPa) | 14.0 | 18.4 | 18.3 | 20.0 | 20.9 | 19.3 | 18.4 | 19.7 |
| % Elongation | 465 | 546 | 534 | 574 | 568 | 546 | 535 | 559 |
| Hardness, RT | 74.7 | 69.9 | 68.8 | 67.0 | 68.1 | 71.0 | 70.0 | 64.3 |
| Hardness, 100° C. | 70.3 | 64.9 | 64.0 | 63.2 | 63.6 | 66.4 | 65.2 | 60.5 |
| Rebound at RT | 47.5 | 46.5 | 47.6 | 46.4 | 47.6 | 47.1 | 46.8 | 48.2 |
| Rebound at 100° C. | 56.5 | 56.8 | 58.1 | 57.1 | 59.1 | 57.3 | 57.0 | 60.5 |
| Rheovibron |  |  |  |  |  |  |  |  |
| E' at 0° C. (MPa) | 30.2 | 34.0 | 24.2 | 30.2 | 26.5 | 34.2 | 26.3 | 22.1 |
| E' at 60° C. (MPa) | 22.1 | 23.6 | 21.2 | 26.8 | 22.1 | 26.3 | 23.1 | 17.2 |
| Tan Delta at 60° C. | .086 | .080 | .074 | .079 | .073 | .079 | .079 | .085 |

[2]Hexamethoxymethylmelamine

Looking at the above data in Table IV, one can see the advantages of the present invention and further illustrating the use of additional polyhydric phenoxy resins. It is well known that use of resorcinol tends to produce a rubber stock that scorches or prematurely cures during processing. Therefore, retarders such as N cyclohexyl thiophthalimide are conventionally used with resorcinol. This data shows that the use of such a retarder can be eliminated further contributing to the advantages of the present invention over prior art components containing resorcinol.

EXAMPLE 11

To demonstrate the non-fuming characteristics of resorcinol versus the polyhydric phenoxy resins, a thermogravimetric analysis was conducted. The resin tested was prepared in accordance with Example 3. The table below shows that the resorcinol has a significantly higher weight loss (upwards to 100%) under 200° C. than the polyhydric phenoxy resin which is a reflection of a chemical's fuming characteristics.

TABLE VI

| °C. | % Weight Loss | |
|---|---|---|
|  | Resorcinol | Polyhydric Phenoxy Resin |
| 150 | 8.4 | 0.3 |
| 160 | 14.0 | 0.6 |
| 180 | 61.0 | 1.3 |
| 190 | 91.8 | 1.9 |
| 200 | 100.0 | 2.4 |
| 210 | 100.0 | 3.7 |

What is claimed is:

1. A rubber stock comprising (1) a rubber selected from the group consisting of natural rubber, cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene and isoprene, copolymers of styrene, and butadiene and mixtures thereof and (2) from about 0.1 to about 10.0 phr of polyhydric phenoxy resin of the formula:

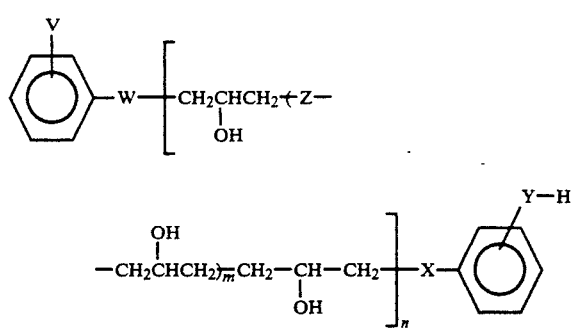

wherein V is —OH or —NH$_2$ and W is —O— or

however, when V is —NH$_2$, W is —O— and when W is

V is —OH;
wherein X and Y are each selected from the group consisting of —O— and

however, when X is —N—, Y is —O— and when Y is

X is —O—;
wherein Z is selected from the group consisting of:

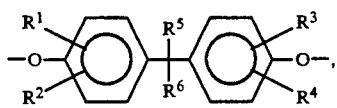

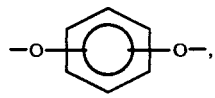

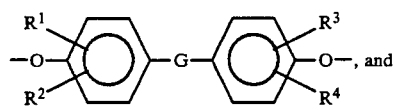

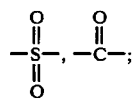

wheren $R^1$, $R^2$, $R^3$, and $R^4$ are each independently selected from the group consisting of H and Cl; $R^5$ and $R^6$ are independently selected from the group consisting of hydrogen, alkyls having from 1 to 9 carbon atoms, and $CQ_3$ where Q is selected from the group consisting of F and Cl; G is selected from the group consisting of —O—, $$-\overset{\overset{O}{\|}}{\underset{\underset{O}{\|}}{S}}-, -\overset{\overset{O}{\|}}{C}-;$$

n is an integer of from 1 to 20; and m is an integer of from 0 to 10.

2. The rubber stock of claim 1 wherein V is —OH, W is —O—, X is —O—, Y is —O—, Z is

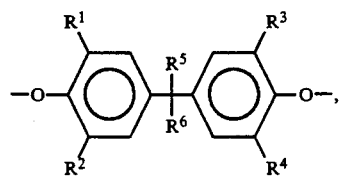

and $R^1$, $R^2$, $R^3$ and $R^4$ are each hydrogen; $R^5$ and $R^6$ are each an alkyl having 1 carbon atom; m is 0 and n is an integer of from about 1 to 5.

3. The rubber stock of claim 1 wherein the polyhydric phenoxy resin ranges from about 2.0 to about 5.0 phr.

4. The rubber stock of claim 1 wherein the polyhydric phenoxy resin has a molecular weight ranging from about 450 to 1,000.

5. A rubber stock comprising (1) a rubber selected from the group consisting of natural rubber, cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene and isoprene, copolymers of styrene, and butadiene and mixtures thereof, and (2) 0.1 to 10.0 phr of a polyhydric phenoxy resin which is the reaction product between (a) resorcinol, aminophenol or mixtures thereof; and (b) an epoxy compound having at least two epoxy groups and selected from the group consisting of the diglycidyl ether of bisphenol A, the diglycidyl ether of tetrachlorobisphenol A, the diglycidyl ether of resorcinol, the diglycidyl ether of cashew phenol, the diglycidyl ether of hydroquinone, the diglycidyl ether of catechol, 5-ethyl-5-methyl-1,3-diglycidylhydantoin and mixtures thereof; wherein said reaction product has a molecular weight ranging from about 450 to about 10,000 and the molar ratio between the (a) resorcinol, aminophenol or mixtures thereof and (b) the epoxy compound ranges from about 3:1 to 1.2:1.

6. The rubber stock of claim 5 wherein the polyhydric phenoxy resin ranges from about 2.0 to about 5.0 phr.

7. The rubber stock of claim 5 wherein resorcinol is used to produce the polyhydric phenoxy resin.

8. The rubber stock of claim 5 wherein aminophenol is used to produce the polyhydric phenoxy resin.

9. The rubber stock of claim 5 wherein the epoxy compound is the diglycidyl ether of bisphenol A.

10. The rubber stock of claim 5 wherein the epoxy compound is the diglycidyl ether of resorcinol.

11. The rubber stock of claim 5 wherein the epoxy compound is 5-ethyl-5-methyl-1,3-diglycidylhydantoin.

12. The rubber stock of claim 5 wherein the molecular weight of the polyhydric phenoxy resin ranges from about 500 to about 2,500.

13. The rubber stock of claim 1 further containing from about 0.1 phr to about 10.0 phr of a methylene donor.

14. The rubber stock of claim 13 wherein the methylene donor is selected from the group consisting of hexamethylene tetramine, hexamethoxymethyl melamine, lauryloxymethyl pyridinium chloride, ethyloxymethyl pyridinium chloride, trioxan hexamethylolmelamine and paraformaldehyde.

15. The rubber stock of claim 13 wherein the methylene donor is selected from the general formula:

wherein X is an alkyl having from 1 to 8 carbon atoms, $R^7$, $R^8$, $R^9$, $R^{10}$ and $R^{11}$ are individually selected from the group consisting of hydrogen, an alkyl having from 1 to 8 carbon atoms, the group —$CH_2OX$ and their condensation products.

16. The rubber stock of claim 13 wherein the methylene donor is selected from the group consisting of hexakis(methoxymethyl)melamine, N,N',N''-trimethyl/N,N',N''0trimethylolmelamine, hexamethylolmelamine, N,N',N''-dimethylolmelamine, N-methylolmelamine, N,N'-dimethylolmelamine, N,N',N''tris(methoxymethyl)melamine and N,N',N''tributyl-N,N',N''-trimethylol-melamine.

17. The rubber stock of claim 13 wherein the weight ratio of methylene donor to the polyhydric phenoxy resin may range from 1:10 to about 10:1.

18. The rubber stock of claim 17 wherein the weight ratio of methylene donor to the polyhydric phenoxy resin may range from about 1:3 to about 3:1.

19. The rubber stock of claim 1 wherein said rubber is cis-1,4-polyisoprene.

* * * * *